(12) United States Patent
O'Malley et al.

(10) Patent No.: US 11,226,137 B2
(45) Date of Patent: Jan. 18, 2022

(54) FLOW CONTROL IN GEOTHERMAL WELLS

(71) Applicants: Edward O'Malley, Houston, TX (US); Eugene Stolboushkin, Houston, TX (US); Alexander Kendall, Houston, TX (US)

(72) Inventors: Edward O'Malley, Houston, TX (US); Eugene Stolboushkin, Houston, TX (US); Alexander Kendall, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/808,762

(22) Filed: Mar. 4, 2020

(65) Prior Publication Data

US 2021/0278106 A1     Sep. 9, 2021

(51) Int. Cl.
*F24T 10/20* (2018.01)
*E21B 43/12* (2006.01)
(Continued)

(52) U.S. Cl.
CPC .............. *F24T 10/20* (2018.05); *E21B 34/06* (2013.01); *E21B 34/08* (2013.01); *E21B 34/10* (2013.01);
(Continued)

(58) Field of Classification Search
CPC .......... E21B 34/06; E21B 34/08; E21B 43/12; E21B 43/17; E21B 43/24; E21B 43/2406; E21B 43/162; F24T 10/20
See application file for complete search history.

(56) References Cited

U.S. PATENT DOCUMENTS

| | | | |
|---|---|---|---|
| 2009/0218089 A1* | 9/2009 | Steele | E21B 43/2408 166/53 |
| 2014/0166280 A1* | 6/2014 | Stone | E21B 43/12 166/268 |

(Continued)

FOREIGN PATENT DOCUMENTS

| | | |
|---|---|---|
| EP | 3611441 A1 | 2/2020 |
| WO | 2019118105 A1 | 6/2019 |
| WO | 2020037062 A1 | 2/2020 |

OTHER PUBLICATIONS

Notification of Transmittal of the International Search Report and the Written Opinion of the International Searching Authority, or the Declaration; PCT/US2021/020655; dated Mar. 3, 2021; 12 pages.

*Primary Examiner* — Tara Schimpf
(74) *Attorney, Agent, or Firm* — Cantor Colburn LLP (57) ABSTRACT

A system for regulating fluid flow in a geothermal energy production system includes a flow control device disposed in an injector well and/or a producer well, which are disposed in a subterranean region. The injector well includes an outflow port configured to inject a fluid into the region, the producer well includes an inflow port configured to receive the fluid from the region, and the outflow port and the inflow port are in fluid communication via one or more passages in the subterranean region between the injector well and the producer well. The flow control device is configured to restrict a flow of a fluid into the producer well based on a temperature and/or a flow rate of the fluid in the flow control device. The temperature and/or the flow rate selected to maintain a temperature of the fluid entering the producer well within a selected range.

20 Claims, 6 Drawing Sheets

(51) Int. Cl.
  *E21B 34/10* (2006.01)
  *E21B 47/10* (2012.01)
  *E21B 47/06* (2012.01)
  *E21B 47/07* (2012.01)
  *E21B 34/06* (2006.01)
  *E21B 43/17* (2006.01)
  *E21B 43/24* (2006.01)
  *E21B 43/16* (2006.01)
  *E21B 34/08* (2006.01)
  *F24T 10/00* (2018.01)

(52) U.S. Cl.
  CPC ............ *E21B 43/12* (2013.01); *E21B 43/162* (2013.01); *E21B 43/17* (2013.01); *E21B 43/24* (2013.01); *E21B 47/06* (2013.01); *E21B 47/07* (2020.05); *E21B 47/10* (2013.01); *E21B 43/2406* (2013.01); *F24T 2010/56* (2018.05)

(56) References Cited

U.S. PATENT DOCUMENTS

| | | |
|---|---|---|
| 2014/0216732 A1 | 8/2014 | Stone et al. |
| 2015/0247391 A1* | 9/2015 | Oliva ................ E21B 43/2408 166/250.01 |
| 2015/0300327 A1 | 10/2015 | Sweatman et al. |
| 2017/0321934 A1 | 11/2017 | Kruger |

* cited by examiner

FLOW CONTROL IN GEOTHERMAL WELLS

BACKGROUND

Some forms of energy production involve a number of diverse activities from various engineering fields to be performed in a borehole. One such form of energy production includes geothermal production. Geothermal wells use heat present under the ground to extract usable energy. Water is pumped into the ground, absorbs energy, and is removed. The heat energy can be used for various purposes, such as driving turbines or otherwise generating electrical power.

SUMMARY

An embodiment of a system f or regulating fluid flow in a geothermal energy production system includes a flow control device disposed in at least one of an injector well and a producer well. The injector well and the producer well are disposed in a subterranean region and separated by a selected distance. The injector well includes an outflow port configured to inject a fluid into the subterranean region, the producer well includes an inflow port configured to receive the fluid from the subterranean region, and the outflow port and the inflow port are in fluid communication via one or more passages in the subterranean region between the injector well and the producer well. The flow control device is configured to restrict a flow of a fluid into the producer well based on at least one of a temperature and a flow rate of the fluid in the flow control device, the at least one of the temperature and the flow rate selected to maintain a temperature of the fluid entering the producer well within a selected range.

An embodiment of a method of regulating fluid flow in a geothermal energy production system includes injecting a fluid into an injector well disposed in a subterranean region, the injector well separated from a producer well in the subterranean region by a selected distance, and advancing the fluid through at least one outflow port into the subterranean region and through one or more passages in the subterranean region. The method also includes restricting a flow of the fluid into the producer well by a flow control device based on at least one of a temperature and a flow rate of the fluid in the flow control device, the at least one of the temperature and the flow rate selected to maintain a temperature of the fluid entering the producer well within a selected range, and producing the fluid by receiving the fluid into the producer well through at least one inflow port.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Systems, devices and methods are presented herein for managing the production of energy from a geothermal system. An embodiment of a system includes at least one thermodynamically sensitive flow control device disposed at an injector well and/or a producer well of a geothermal energy production system. The flow control device may be a passive or active device configured to restrict or otherwise control the flow of fluid therethrough based on a temperature and/or flow rate of the fluid flowing therethrough. Each flow control device is in fluid communication with a production zone established by an outflow port at the injector well, fluid passages (including, e.g., natural and/or created fractures) in a formation region between the injector and producer wells, and an inflow port at the producer well. The flow control device or devices may be configured in various ways to facilitate efficient and effective thermal energy extraction by controlling the flow rate of fluid through the region to prevent the fluid from exceeding a threshold temperature and/or to distribute the thermal energy collected at each zone.

Each flow control device may be a passive device or active device. A passive device is configured to restrict flow by virtue of, e.g., the selected size of a restriction in the flow control device, and without active control. An active device is connected to a control mechanism such as a surface or downhole processor that acts to control a valve or other component to restrict flow based on, for example, a measurement of a flow property such as flow rate, temperature and/or density.

In one embodiment, the system includes a passive flow control device, such as an inflow control device (ICD) having restrictions configured to restrict flow if the fluid therein exceeds (or falls below, or is out of a selected range or value) a fluid parameter such as a threshold temperature, flow rate and/or pressure drop (differential pressure across a restriction). The ICD may be responsive based on one or a combination of these parameters. In this way, fluid that absorbs too much heat (e.g., that could cause steaming in the producer well) can be directed to other zones to at least partially equalize the fluid temperature of the fluid entering the producer at each zone, and thereby improve or optimize the production of heated fluid.

Embodiments described herein present numerous advantages. As discussed further below, various conditions in the borehole(s) and/or in a formation region can cause water to flow through the formation at rates that are undesirable. For example, water flowing through the formation at a sufficiently high rate can result in the water absorbing an insufficient amount of energy and resulting in produced water having a lower temperature than desired. Conversely, water flowing at too low a rate can result in the water heating too much, which can result in steam generation in the borehole. In addition, uneven flow rates through different zones established by the system also has detrimental effects.

The embodiments described herein address such challenges by controlling flow through a formation region to ensure a proper flow rate that results in a desired temperature of the produced water, and/or by balancing flow rates of the zones to ensure a desired distribution of the temperature of fluid entering the zones of a geothermal production system.

Figure 1:
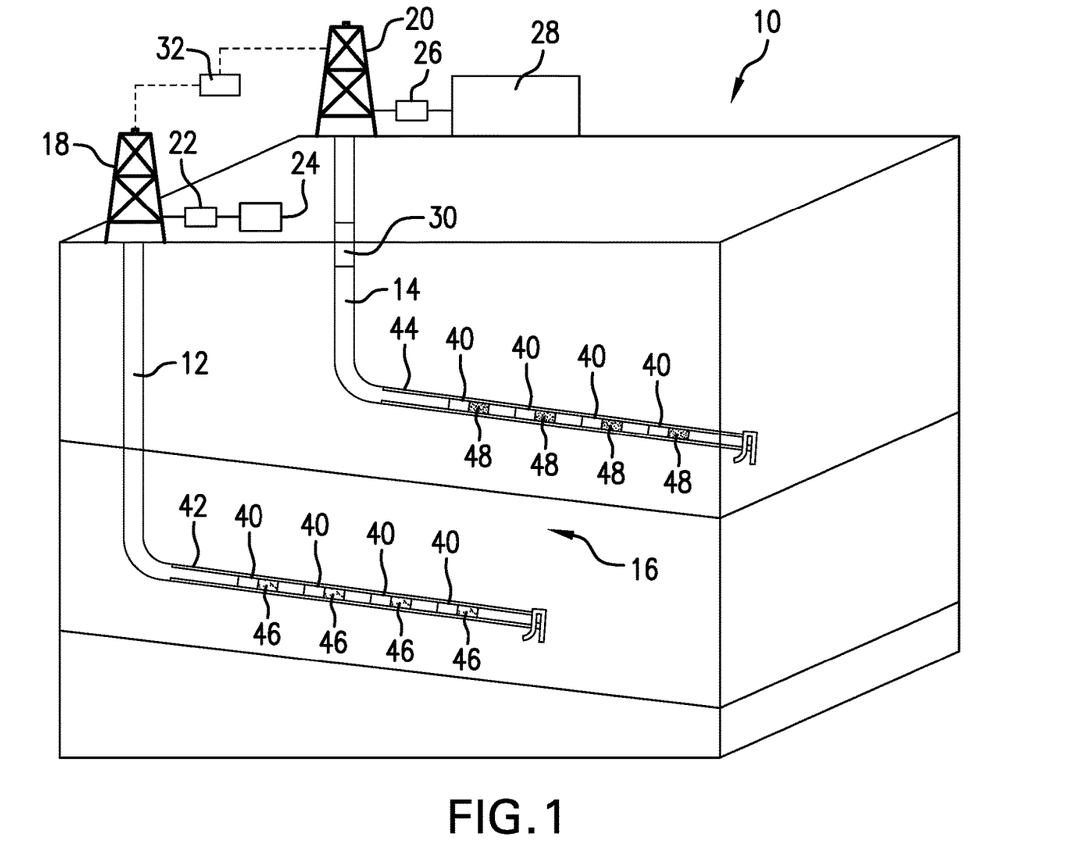
FIG. 1 depicts an embodiment of a geothermal energy production system including an injector well, a producer well, and one or more flow control devices.

Referring to FIG. 1, an embodiment of a geothermal energy extraction system 10 includes a first borehole 12 and a second borehole 14 extending into a subterranean region 16. The subterranean region may be an geologically active formation or any subterranean region or formation having a temperature sufficient to produce a usable amount of heat energy.

The first borehole 12, also referred to as an injector well 12, is connected to surface equipment configured to inject water therein and includes a length extending generally horizontally in the subterranean region. The second borehole 14, also referred to as a producer well 14, includes a length at the same or a similar depth that also extends generally horizontally. It is noted that the depths, lengths and paths defined by the injector well 12 and the producer well 14 are not limited to the specific configurations described herein; the wells can be at any suitable depth, have any suitable direction (e.g., vertical, horizontal or deviated) and be positioned relative to each other in any manner such that injected water can flow through the subterranean region 16 between the wells.

For production of energy, cold fluid is injected into the injector well 12 via surface equipment 18 (e.g., a drill rig) under pressure and migrates through the subterranean region 16 into the producer well 14, from which the fluid is brought to the surface at surface equipment 20. "Cold" as described herein refers to a temperature below the subterranean region temperature and below the temperature of produced water. "Hot" as described herein refers to water that has been heated to a temperature above the temperature of the injected water. For example, it may be desired that the hot water have a temperature above the water's boiling point at the surface. In this example, steam can be generated that can be transmitted to a turbine or transmitted for another use. It is noted that, although the injected fluid is described herein as water, the injected fluid may be any suitable liquid.

Any suitable drive mechanism can be used to facilitate production of the heated fluid. Examples of such mechanisms include geologic pressure, injector pump pressure, producer pump pressure or a combination thereof. For example, as shown in FIG. 1, the injector surface equipment 18 includes a fluid control system 22 including one or more pumps in fluid communication with a fluid source 24. Alternatively, or in addition, the producer surface equipment 20 includes a pumping system 26 and piping or other mechanism to transmit heated water and/or steam to a desired facility 28, such as an electric power plant or heating system. A lift mechanism such as an Electric Submersible Pump (ESP) 30 may be disposed downhole as desired to facilitate circulation of fluid.

The system 10 may include one or more processing devices configured to perform various functions. For example, a controller or other processing unit 32 is in communication with the surface equipment 18 and/or the surface equipment 20. The processing device or devices are not so limited. For example, processing units may be disposed downhole (e.g., in the injector well). The processing unit 32 includes components for performing functions such as controlling fluid flow through the system 10, controlling downhole components, monitoring components, transmitting and receiving data, processing measurement data and/or monitoring operations.

The system 10 also includes one or more flow control devices 40 disposed at the injector well 12 and/or the producer well 14. The flow control devices 40 are configured to control the flow rate of the fluid through the subterranean region in order to control the temperature of the fluid and/or to control the distribution of temperature of the fluid entering through multiple production zones. Examples of flow control devices include active inflow control devices (ICDs), passive flow control devices, screens, valves, sleeves and others.

In the embodiment of FIG. 1, the system 10 is shown as having a plurality of flow control devices 40 in each of the injector well 12 and the producer well 14. However, the system 10 is not so limited and can have any number of flow control devices 40. For example, a single flow control device 40 may be disposed in the injector well 12 or the producer well 14, a flow control device 40 can be disposed in both the injector well 12 and the producer well 14, a plurality of flow control devices 40 may be disposed in the producer well, or one or more flow control devices 40 may be included in each of the producer well 12 and the injector well 12.

Referring again to FIG. 1, in one embodiment, an injection string 42 is disposed in at least a horizontal section of the injector well 12, and a production string 44 is disposed in at least a horizontal section of the producer well 14. The strings may include any type of component, such as a drill string, completion string, casing or liner, pipe segments, coiled tubing, etc.

For example, the injection string 42 includes a tubular that extends along at least the horizontal section, and a plurality of outflow ports 46. The outflow ports 46 provide an opening to establish fluid communication with the subterranean region 16. The outflow ports 46 may be configured as holes, perforations, screens or any other component or mechanism that establishes the fluid communication. A flow control device 40 is disposed at or connected to each of the outflow ports 46.

The production string 44 includes a tubular that extends along at least the horizontal section, and a plurality of inflow ports 48. Each inflow port 48 provides an opening to establish fluid communication with the subterranean region 16. The inflow ports 48 may be configured as holes, perforations, screens, etc. A flow control device 40 is disposed at or connected to each of the inflow ports 48. As noted above, the number, type and configuration of the flow control devices 40 is not limited to those described herein.

Various tools and/or sensors may be incorporated in the system 10. For example, one or more measurement tools can be deployed downhole for measuring parameters, properties or conditions of the borehole, formation and/or downhole components. Examples of sensors include temperature sensors, pressure sensors, flow measurement sensors, porosity sensors (e.g., nuclear sensors or acoustic sensors), fluid property sensors and others.

Each flow control device 40 is configured to restrict fluid flow therethrough based on properties of the fluid and/or properties of the fluid flow. For example, one or more flow control devices can be configured to restrict flow based on a temperature of the fluid, e.g., based on the fluid being below a selected temperature or above a threshold temperature. In addition, or alternatively, one or more flow control devices can be configured to restrict flow based on a flow rate of the fluid exceeding a threshold flow rate. This control acts to prevent fluid that is too hot from entering the producer well 14 and/or to control the temperature distribution along the producer well 14.

Examples of active flow control devices include electrically controlled inflow control valves (ICVs) and inflow control devices (ICDs), and hydraulically controlled ICVs and ICDs. Active flow control devices may include controllable flow control features such as sliding sleeves, ball valves and other valve types. Passive flow control devices include passive ICDs, which include flow conduits typically formed on a tubular body. One or more restrictions in the fluid conduits are configured to restrict flow based on fluid flow rate, temperature, density and/or other fluid properties. Restrictions can be formed by, for example, nozzles, portions of fluid conduits having reduced size or diameter, flow control bodies in the fluid conduits, and others.

Figure 2:
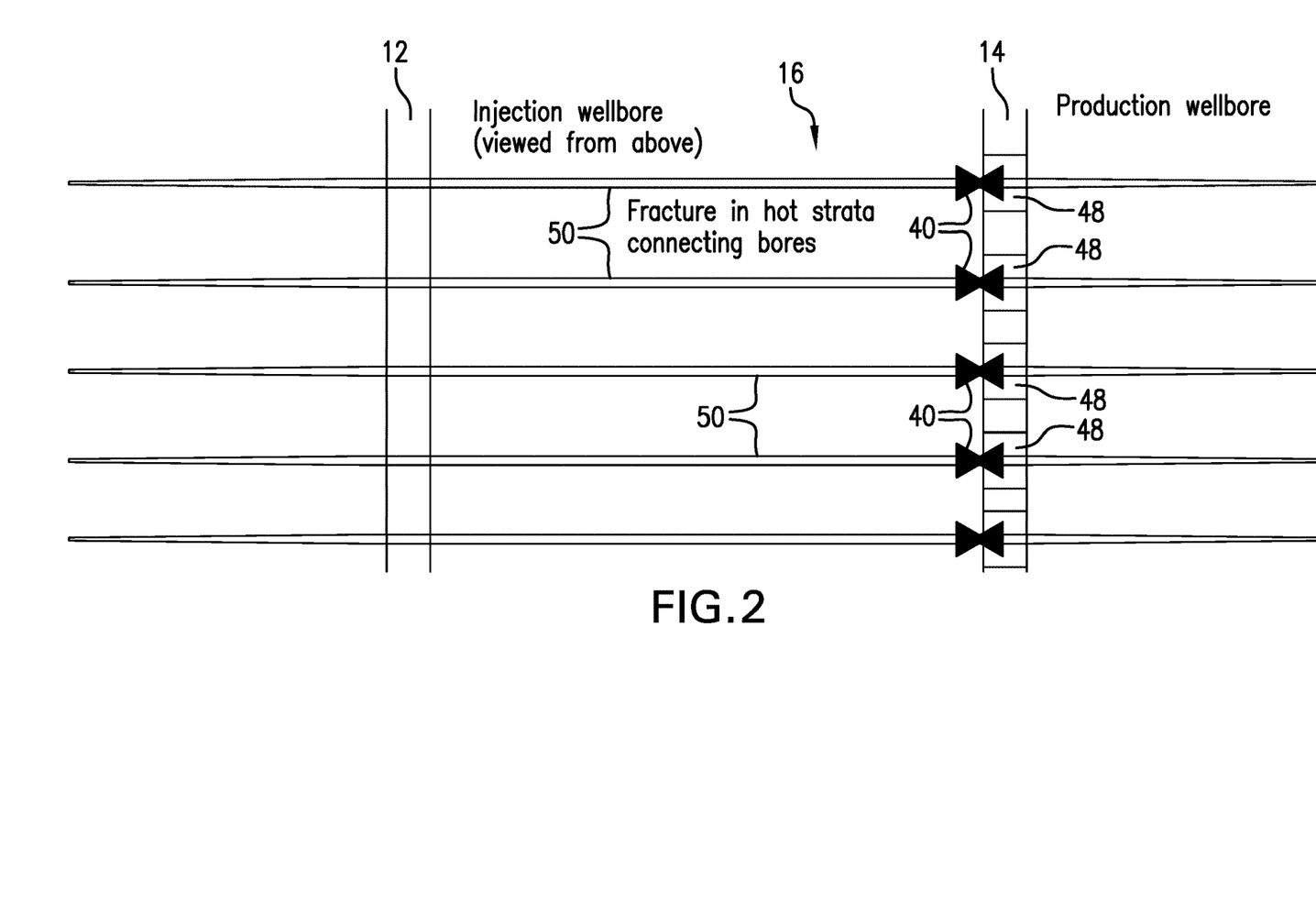
FIG. 2 depicts sections of the producer well and the injector well of FIG. 1, and fluid passages in a subterranean region therebetween.

FIG. 2 depicts an embodiment of the system 10, which includes a flow control device 40 at each production zone. A production zone is established by an outflow port 46, an inflow port 48 and passages 50 in the region 16 that provide flow paths therebetween. The passages 50 may be, for example, natural fractures and/or other permeable features of the formation, created fractures (e.g., by hydraulic fracturing), perforations, a lateral borehole connecting the wells (e.g., via sidetracking), or a combination thereof. For example, the system 10 shown in FIG. 2 includes five production zones, denoted as zones A to E.

During a geothermal energy production process, cold water (or other fluid) is injected into the injector well 12, and the water flows through an outflow port 44 at each zone. The fluid migrates through the various passages 50 in the region 16 that provide flow paths between the injector well 12 and the producer well 14, and through the inflow ports 48. As the fluid migrates into the producer well 14, it absorbs heat energy, and this heat energy is brought to the surface through the producer well 14 to the surface equipment 20.

Natural differences in injection profile and reservoir conductivity can cause water (or other fluid) from the injector well to have uneven dwell times in the formation, resulting in water at the producer well having hot regions and cold regions. The flow control devices 40, by restricting the flow of fluid having a temperature above a threshold temperature, fluid that is too hot is restricted so that fluid having an excessive temperature (e.g., a temperature that causes steam to form in the producer well 14) can be prevented from entering the producer well 14. In addition, by restricting excessively hot water, this water can be redirected to other zones, which has the effect of at least partially equalizing the temperature distribution among the zones.

One or more flow control devices can be arrayed along the producer well 14, the injector well 12 or both. For example, the producer well 14 includes one or more flow control devices 40, and the injector well 12 may or may not include one or more flow control devices. A flow control device or devices 40 (or any other type of flow control mechanism may be incorporated into the injector well 12 to produce a balanced fluid injection profile (e.g., a similar pressure, temperature and/or flow rate is maintained for each outflow port 46).

In some cases, it may be desirable to choke or restrict flow if the fluid is too cool, i.e., falls below a selected temperature. As a result, the cooler fluid can mix with fluid from other zones and reduce the overall temperature to that below the desired temperature at the surface.

To address such cases, one or more inflow control devices 40 may be configured to become more restrictive and thereby choke the flow of fluid in a zone in which the fluid is not sufficiently hot. Choking the flow will reduce the flow rate through the subterranean region 16, which allows the fluid to absorb more heat and brings the fluid temperature in a given zone to a desired inflow temperature so that the overall temperature of the produced water is hot enough for a desired purpose.

In on embodiment, one or more of the flow control devices are configured as passive devices that restrict fluid flow by causing fluid flowing therethrough to cavitate. As discussed in more detail below, a cavitating inflow control device accelerates fluid, causing the static pressure to drop. When the static pressure drops to the saturation pressure for fluid of a given temperature, the mass flow rate is choked. In this way, hot spots can be suppressed by choking the inflow at that zone. This redirects fluid to adjacent zones.

Figure 3:
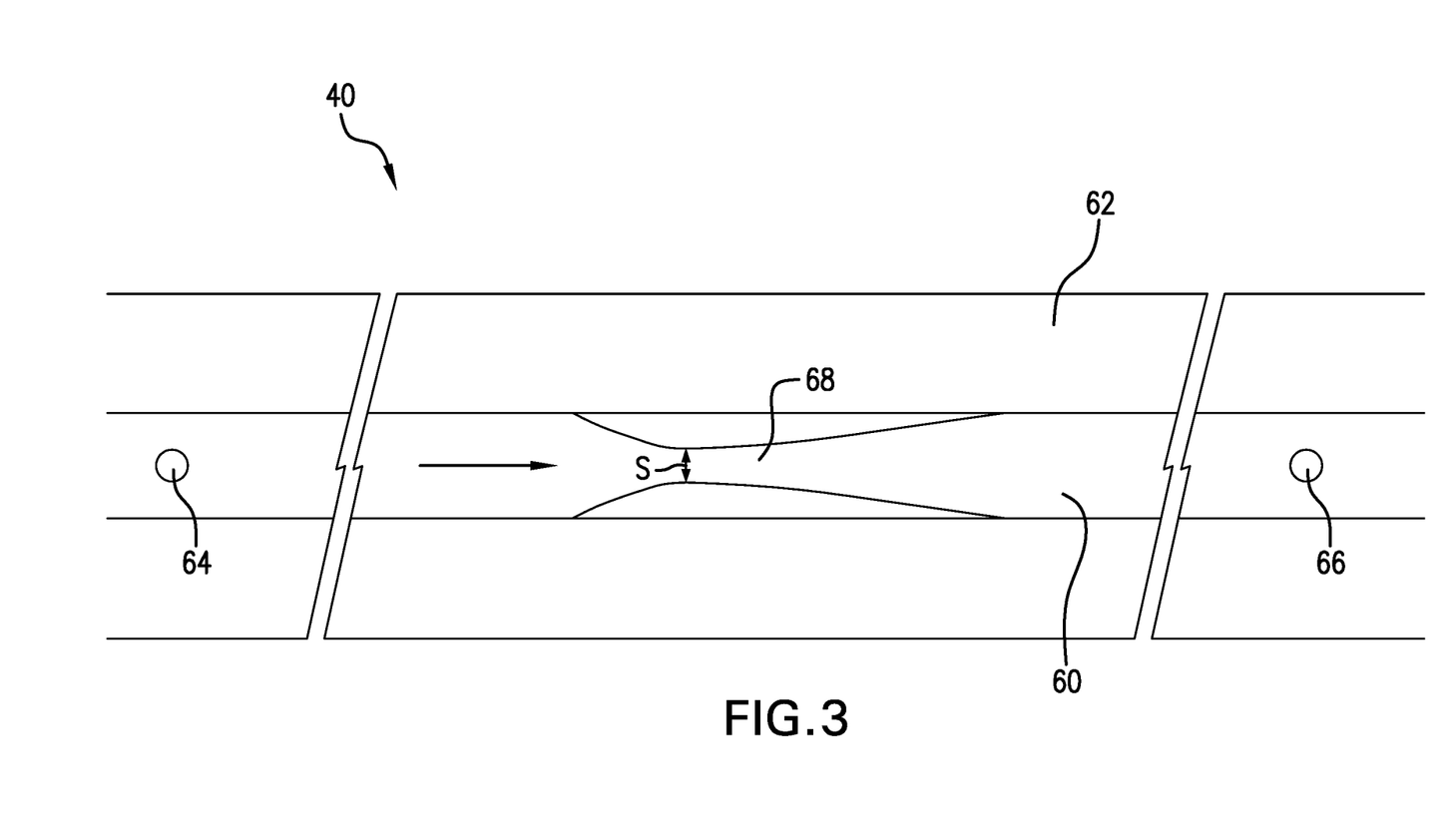
FIG. 3 depicts an embodiment of a passive fluid control device.

FIG. 3 illustrates component of a flow control device that is configured to choke or restrict flow based on subcool, either by cavitation or other phenomenon. The flow control device 40 includes a fluid channel 60 disposed on or in a body 62. The body 62 may be a cylindrical body having a central fluid conduit, such as a pipe segment, tool body or other component of the injection string 42 or the production string 44. An inlet 64 is in fluid communication with fluid flowing into the subterranean region 16 from an outflow port 46, or with fluid flowing into an inflow port 48 from the region 16. Fluid in the flow control device flows through the channel 60 to an outlet 66 in fluid communication with the region or the producer well 14. The fluid channel 60 may be form a linear path or define any fluid path, such as a curved, circumferential, circular, ring-shaped or helical path.

A restriction 68 or throat is formed within the fluid channel 60, which causes the fluid velocity to increase and the fluid pressure to decrease to cause cavitation of the fluid or otherwise restrict fluid flow if the fluid reaches a certain fluid subcool temperature ("subcool"). This cavitation acts to reduce the flow rate. The restriction 68 may be formed by a reduction of the fluid channel diameter or size as shown in FIG. 3. The restriction 68 may also be formed by inserting a flow control body in the fluid channel 60 to establish a selected throat size.

The "subcool" of a fluid refers to a fluid temperature relative to the saturation temperature of the fluid at a given fluid pressure. Subcool is a combined parameter of temperature and pressure (for example, a 2° subcool corresponds to one temperature at 500 PSI and a different temperature at 250 PSI). Subcool-sensitive ICDs and/or other devices adjust to subcool, as opposed to temperature or pressure independently.

Saturation properties of the fluid can be represented by a saturation curve plotted as a function of temperature and pressure (and/or differential pressure). A fluid that exists on the saturation curve has some combination of vapor (steam and gas) and liquid. Fluid above the saturation curve is entirely in the liquid state, and is referred to as subcooled liquid. The restriction 68 is configured to cause fluid to cavitate by increasing fluid velocity until the pressure falls to a value at the saturation curve for a given temperature. In order to cause cavitation, the restriction has a minimum size or throat size "S" selected based on the measured or anticipated pressure and temperature of fluid flowing into the restriction. As the fluid exits the restriction 68, the fluid pressure recovers, and the fluid returns to a liquid.

Cavitating flow control devices can be used, for example, to control fluid flow through the subterranean region 16 to restrict excessively heated fluid from entering the producer well 14 and causing steaming to occur within the producer well. Steam forming in the producer well 14 can produce a number of detrimental effects, such as erosion of equipment and reduction in efficiency. For example, when liquid and steam are present in a borehole, the steam is a small fraction of the mass flow rate, but a large fraction of the volume. As a result, the amount of heated fluid that can be produced is significantly reduced, which reduces the efficiency of a geothermal operation. In addition, the presence of steam increases the amount of energy needed to produce a corresponding unit of energy, which reduces the overall amount of energy production. Cavitating flow control devices as discussed herein (as well as other embodiments such as passive ICDs and other types of passive ICDs) can restrict fluid flow before steam is formed and/or after steam is formed, which redirects water away from overly hot zones. As a result, more heat can be extracted from the other zones with a reduced effected of the steam.

In one embodiment, the system includes a flow control device 40 at each inflow port 48 to control fluid flow through each of a plurality of production zones. Aspects of this embodiment are discussed in conjunction with FIGS. 4 and 5. As discussed further below, each flow control device 40 is a passive flow control device (e.g., a passive ICD) that is configured to restrict flow if fluid exceeds a threshold flow rate.

It is noted that, although the following description discusses flow restriction based on flow rate, similar effects can be accomplished using flow control devices responsive to flow rate and/or temperature.

Figure 4:
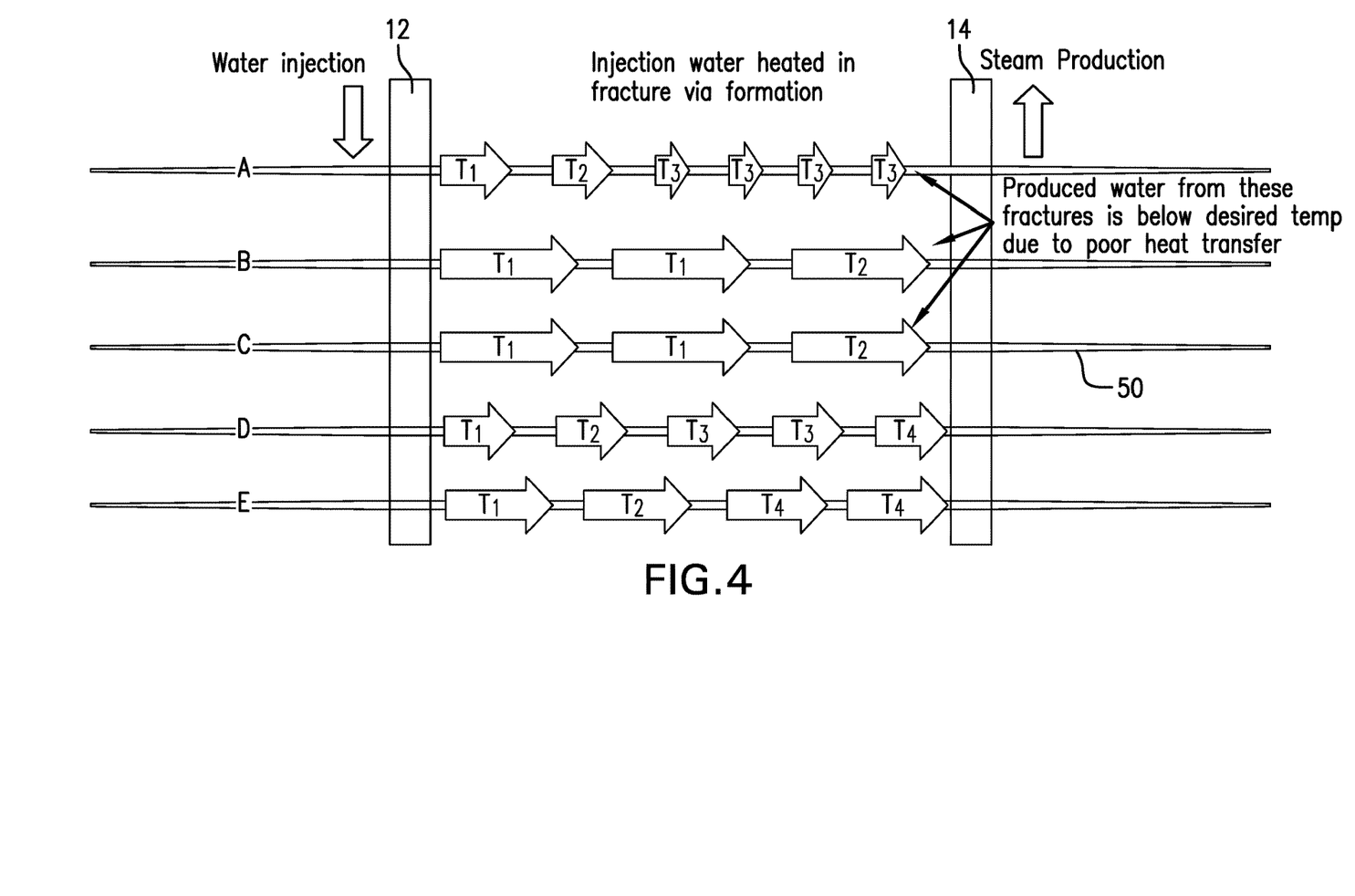
FIG. 4 depicts sections of a producer well and an injector well of a geothermal energy production system, and illustrates an example of fluid flow between the producer well and the injector well.
Figure 5:
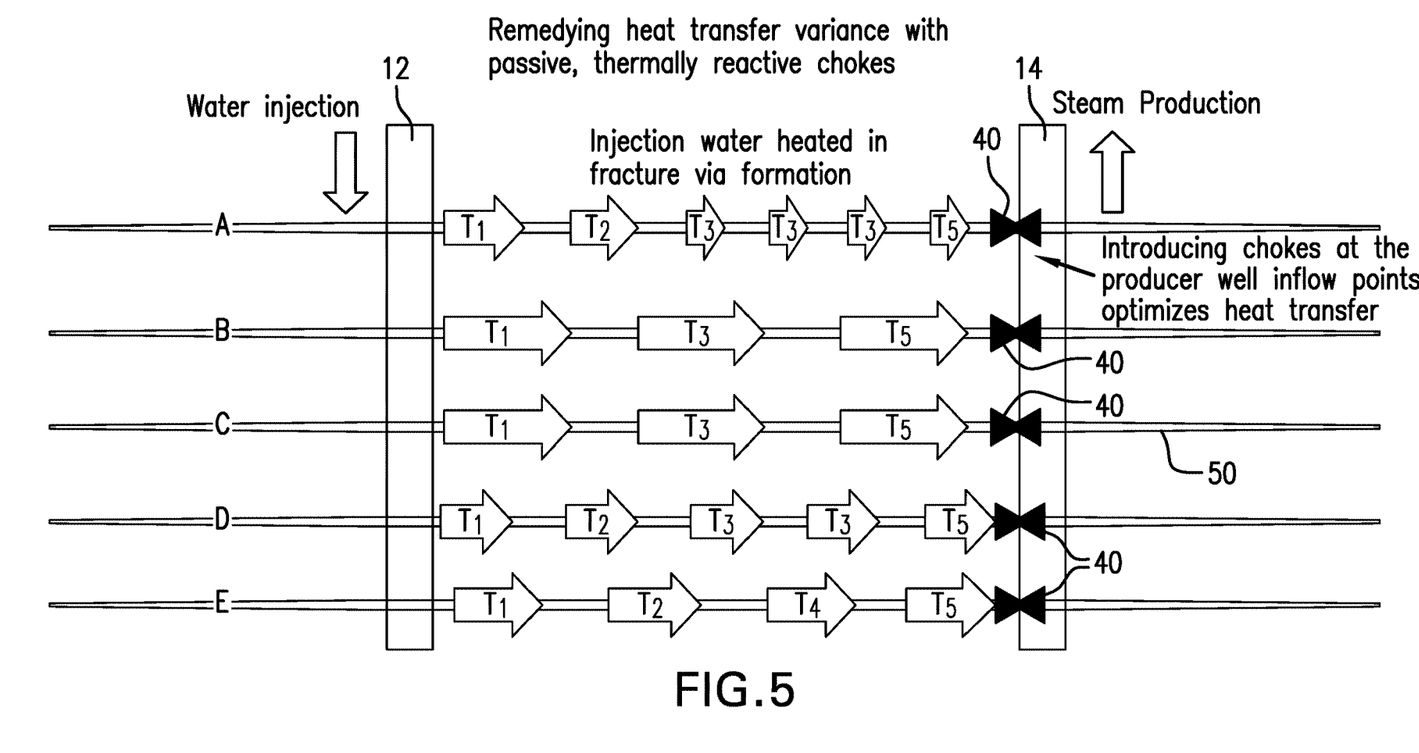
FIG. 5 depicts an embodiment of the system of FIG. 4, and depicts an effect of flow control devices disposed in the producer well at multiple production zones.

FIG. 4 depicts a scenario in which varying fracture geometries and/or variable heat transfer rates results in a flow and temperature distribution results in produced water being below a desired temperature. FIG. 5 depicts an example of the use of flow control devices 40 to passively control the flow rate and thermal distribution among the various zones. The production zones are denoted as zones A to E.

In FIGS. 4 and 5, arrows of differing lengths represent the flow rate of fluid as the fluid flows through each zone from an outflow port 46 to an inflow port 48. Also, the temperature of the fluid is denoted by values T1 to T5, where T1 represents a low temperature (the injection temperature), and T1 to T5 represent successively increasing temperatures, and T5 represents a highest temperature.

As shown in FIG. 4, the flow rate through the various zones is uneven, resulting in an unequal temperature profile. In zone A, the flow rate is relatively low, which results in the fluid heating from temperature T1 to T3, entering the producer well 14 as temperature T3. The flow rate through zones B and C is relatively high; the fluid does not dwell in the region long enough to absorb sufficient heat, so that relatively cool fluid (temperature T2) enters to producer well 14. The flow in zones D and E has flow rates between that of the other zones and is raised to a temperature T4, which is higher than that of other zones but lower than a desired temperature of T5. Thus, it can be seen that the temperature distribution is uneven and too cool for its intended purpose.

FIG. 5 depicts the system 10 including a flow control device 40 configured as a passive ICD at or in fluid communication with each inflow port. As shown, the water in zones B and C is choked to reduce the flow rate, which causes the water in these zones to absorb more heat from the region and thereby heat the water to a sufficient temperature. Therefore, the overall flow rate through the region is reduced, and the difference between the temperatures between the zones is reduced. As a result of this, the system 10 can be run at improved or maximum efficiency, where the ratio of energy to pump the water to the energy extracted is reduced or minimized.

In the above example, the flow control devices 40 are all configured to restrict flow based on the same or similar fluid flow rate (or temperature). In some instances, it may be desirable to tune the flow control devices 40 to restrict flow in response to different flow rates and/or temperatures to equalize the temperature, or to create a thermal gradient along the length of the producer well 14 at inflow points.

Figure 6:
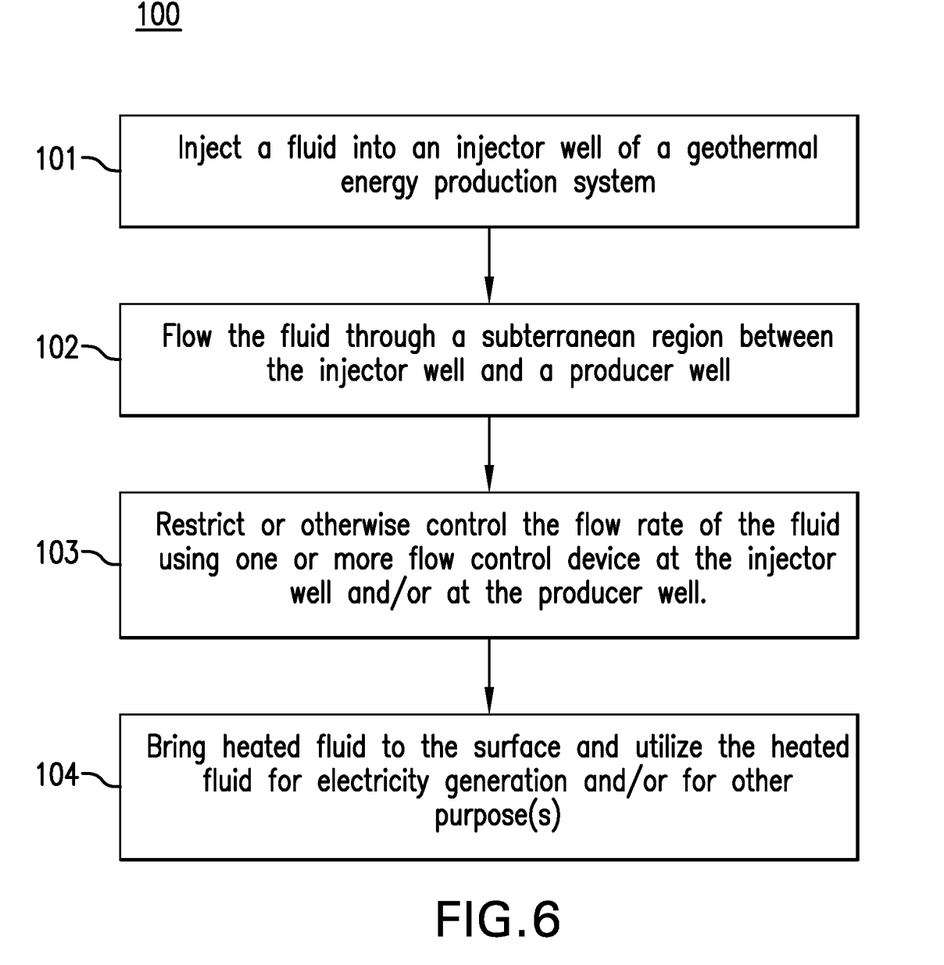
FIG. 6 is a flow diagram depicting an embodiment of a method of geothermal energy production and control of fluid flow.

Referring to FIG. 6, a method 100 of producing geothermal energy and regulating fluid flow includes one or more stages 101-104. In one embodiment, the method 100 includes the execution of all of stages 101-104 in the order described. However, certain stages may be omitted, stages may be added, or the order of the stages changed. Although the method 100 is described in conjunction with the system 10, the method 200 may be utilized in conjunction with any production system that incorporates injection of fluids for facilitating production.

In the first stage 101, a fluid such as water is injected into the injector well 12 at a selected flow rate and pressure. The flow rate and pressure may be controlled by a pumping device and processing device, e.g., at the surface equipment 18. The injector well 12 extends horizontally into geologically active strata or another suitable subterranean region. The producer well 14 also extends horizontally into the strata. The horizontal sections of the injector well 12 and the producer well 14 are separated by a distance, which may be selected based on, for example, the known or expected downhole temperature in the strata, and the pressure and flow rate of the injected water.

In one embodiment, the injector well 12 includes a plurality of outflow ports 46 at respective locations along the horizontal section of the injector well. The producer well 14 includes a plurality of inflow ports 48 along the horizontal section of the producer. The inflow and outflow ports are located to establish production zones, where each production zone includes an inflow port, and outflow port and fluid paths in the strata therebetween.

In the second stage 102, injected water flows through the strata at one or more production zones. As the water advances to the producer well 14, it absorbs heat from the strata.

In the third stage 103, the flow rate of the water through one or more zones is restricted or otherwise controlled to regulate the flow rate through the region. In one embodiment, one or more flow control devices 40 are configured to restrict the flow of fluid through one or more zones to limit the temperature of water entering the producer well 14. The flow control devices 40 may be passive flow control devices or active flow control devices. In another embodiment, a flow control device 40 is disposed in the producer well 14 to control fluid through each production zone. Flow control devices 40 may also be included in the injector well 12 as desired. The flow control devices act to prevent water exceeding a threshold temperature from entering the producer well, and/or act to equalize or otherwise control the thermal distribution of water entering the producer well 14.

In the fourth stage 104, heated water is brought to the surface, and is utilized for various purposes. For example, the produced water has a temperature above the boiling point when reaching the surface, and thereby generates stream that can be used for purposes such as electricity production and/or heating of a building, house or other dwelling.

Set forth below are some embodiments of the foregoing disclosure:

Embodiment 1: A system for regulating fluid flow in a geothermal energy production system, the system comprising: a flow control device disposed in at least one of an injector well and a producer well, the injector well and the producer well disposed in a subterranean region and separated by a selected distance, the injector well including an outflow port configured to inject a fluid into the subterranean region, the producer well including an inflow port configured to receive the fluid from the subterranean region, the outflow port and the inflow port in fluid communication via one or more passages in the subterranean region between the injector well and the producer well, wherein: the flow control device is configured to restrict a flow of a fluid into the producer well based on at least one of a temperature and a flow rate of the fluid in the flow control device, the at least one of the temperature and the flow rate selected to maintain a temperature of the fluid entering the producer well within a selected range.

Embodiment 2: The system of any prior embodiment, wherein the flow control device is selected from a passive inflow control device (ICD) and an active ICD.

Embodiment 3: The system of any prior embodiment, wherein the flow control device is configured to restrict the flow based on the flow rate of the fluid in the flow control device exceeding a threshold flow rate, the threshold flow rate selected to prevent fluid exceeding a selected temperature from entering the producer well.

Embodiment 4: The system of any prior embodiment, wherein the flow control device is configured to restrict the flow based on the temperature of the fluid in the flow control device exceeding a threshold temperature.

Embodiment 5: The system of any prior embodiment, wherein the flow control device is a passive flow control device including one or more fluid channels, the one or more fluid channels including one or more restrictions configured to choke fluid flow based on at least one of: a selected subcool of the fluid, a selected pressure and a selected pressure differential.

Embodiment 6: The system of any prior embodiment, wherein the subcool temperature is selected to prevent fluid within the producer well from forming steam within the producer well.

Embodiment 7: The system of any prior embodiment, wherein the flow control device is configured to restrict the flow based on the temperature of the fluid in the flow control device falling below a threshold temperature.

Embodiment 8: The system of any prior embodiment, wherein the injector well includes a plurality of outflow ports arrayed along a section of the injector well, the producer well includes a plurality of inflow ports arrayed along a section of the producer well, and the system includes a plurality of the flow control devices, each flow control device in fluid communication with a respective inflow port of the plurality of inflow ports.

Embodiment 9: The system of any prior embodiment, wherein the plurality of flow control devices are configured to reduce a variation in a temperature of the fluid entering each inflow port to at least partially equalize a distribution of fluid temperature in the producer well.

Embodiment 10: The system of any prior embodiment, wherein the plurality of flow control devices are configured to control a temperature of the fluid entering each inflow port to produce a selected thermal gradient in the producer well.

Embodiment 11: A method of regulating fluid flow in a geothermal energy production system, comprising: injecting a fluid into an injector well disposed in a subterranean region, the injector well separated from a producer well in the subterranean region by a selected distance; advancing the fluid through at least one outflow port into the subterranean region and through one or more passages in the subterranean region; restricting a flow of the fluid into the producer well by a flow control device based on at least one of a temperature and a flow rate of the fluid in the flow control device, the at least one of the temperature and the flow rate selected to maintain a temperature of the fluid entering the producer well within a selected range; and producing the fluid by receiving the fluid into the producer well through at least one inflow port.

Embodiment 12: The method of any prior embodiment, wherein the flow control device is selected from a passive inflow control device (ICD) and an active ICD.

Embodiment 13: The method of any prior embodiment, wherein the restricting is performed by the flow control device based on the flow rate of the fluid in the flow control device exceeding a threshold flow rate, the threshold flow rate selected to prevent fluid exceeding a selected temperature from entering the producer well.

Embodiment 14: The method of any prior embodiment, wherein the restricting is performed by the flow control device based on the temperature of the fluid in the flow control device exceeding a threshold temperature.

Embodiment 15: The method of any prior embodiment, wherein the flow control device is a passive flow control device including one or more fluid channels, the one or more fluid channels including one or more restrictions configured to choke fluid flow based on at least one of: a selected subcool of the fluid, a selected pressure and a selected pressure differential.

Embodiment 16: The method of any prior embodiment, wherein the injector well includes one or more flow control devices configured to create a balanced fluid injection profile.

Embodiment 17: The method of any prior embodiment, wherein the restricting is performed by the flow control device based on the temperature of the fluid in the flow control device falling below a threshold temperature.

Embodiment 18: The method of any prior embodiment, wherein the injector well includes a plurality of outflow ports arrayed along a section of the injector well, the producer well includes a plurality of inflow ports arrayed along a section of the producer well, and the production system includes a plurality of the flow control devices, each flow control device in fluid communication with a respective inflow port of the plurality of inflow ports.

Embodiment 19: The method of any prior embodiment, wherein the plurality of flow control devices are configured to reduce a variation in a temperature of the fluid entering each inflow port to at least partially equalize a distribution of fluid temperature in the producer well.

Embodiment 20: The method of any prior embodiment, wherein the plurality of flow control devices are configured to control a temperature of the fluid entering each inflow port to produce a selected thermal gradient in the producer well.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. Accordingly, it is to be understood that the present invention has been described by way of illustrations and not limitation. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for regulating fluid flow in a geothermal energy production system, the system comprising:
    a flow control device disposed in at least one of an injector well and a producer well of the geothermal energy production system, the injector well and the producer well disposed in a subterranean region and separated by a selected distance, the injector well including an outflow port configured to inject a fluid in a liquid state into the subterranean region, the producer well including an inflow port configured to receive the fluid from the subterranean region, the outflow port and the inflow port in fluid communication via one or more passages in the subterranean region between the injector well and the producer well, wherein:
    the flow control device is configured to restrict a flow of the fluid into the producer well based on a flow rate of the fluid through the flow control device, and the flow control device is configured to restrict the flow of the fluid based on a selected subcool of the fluid in the liquid state, the flow rate selected to maintain the fluid entering the producer well within a selected temperature range.

2. The system of claim 1, wherein the flow control device is selected from a passive inflow control device (ICD) and an active ICD.

3. The system of claim 1, wherein the flow control device is configured to restrict the flow based on the flow rate of the fluid in the flow control device exceeding a threshold flow rate, the threshold flow rate selected to prevent fluid exceeding a selected temperature from entering the producer well.

4. The system of claim 1, wherein the flow control device is configured to restrict the flow based on the temperature of the fluid in the flow control device exceeding a threshold temperature.

5. The system of claim 4, wherein the flow control device is a passive flow control device including one or more fluid channels, the one or more fluid channels including one or more restrictions configured to choke fluid flow based on the selected subcool of the fluid.

6. The system of claim 5, wherein the subcool temperature is selected to prevent fluid within the producer well from forming steam within the producer well.

7. The system of claim 1, wherein the flow control device is configured to restrict the flow by causing cavitation of the fluid based on the fluid in the flow control device being at the selected subcool.

8. The system of claim 1, wherein the injector well includes a plurality of outflow ports arrayed along a section of the injector well, the producer well includes a plurality of inflow ports arrayed along a section of the producer well, and the system includes a plurality of the flow control devices, each flow control device in fluid communication with a respective inflow port of the plurality of inflow ports.

9. The system of claim 8, wherein the plurality of flow control devices are configured to reduce a variation in a temperature of the fluid entering each inflow port to at least partially equalize a distribution of fluid temperature in the producer well.

10. The system of claim 8, wherein the plurality of flow control devices are configured to control a temperature of the fluid entering each inflow port to produce a selected thermal gradient in the producer well.

11. A method of regulating fluid flow in a geothermal energy production system, comprising:
    injecting a fluid into an injector well of the geothermal energy production system, the injector well disposed in a subterranean region, the injector well separated from a producer well in the subterranean region by a selected distance;
    advancing the fluid in a liquid phase through at least one outflow port into the subterranean region, and flowing the fluid through one or more passages in the subterranean region;
    restricting a flow of the fluid into the producer well by a flow control device based on a flow rate of the fluid in the flow control device, and restricting the flow of the fluid based on a selected subcool of the fluid in the liquid state, the flow rate selected to maintain the fluid entering the producer well within a selected temperature range; and
    producing the fluid by receiving the fluid into the producer well through at least one inflow port.

12. The method of claim 11, wherein the flow control device is selected from a passive inflow control device (ICD) and an active ICD.

13. The method of claim 11, wherein the restricting is performed by the flow control device based on the flow rate of the fluid in the flow control device exceeding a threshold flow rate, the threshold flow rate selected to prevent fluid exceeding a selected temperature from entering the producer well.

14. The method of claim 11, wherein the restricting is performed by the flow control device based on the temperature of the fluid in the flow control device exceeding a threshold temperature.

15. The method of claim 14, wherein the flow control device is a passive flow control device including one or more fluid channels, the one or more fluid channels including one or more restrictions configured to choke fluid flow based on a selected subcool of the fluid.

16. The method of claim 11, wherein the injector well includes one or more flow control devices configured to create a balanced fluid injection profile.

17. The method of claim 11, wherein the restricting is performed by the flow control device by causing cavitation of the fluid based on the fluid in the flow control device being at the selected subcool.

18. The method of claim 11, wherein the injector well includes a plurality of outflow ports arrayed along a section of the injector well, the producer well includes a plurality of inflow ports arrayed along a section of the producer well, and the production system includes a plurality of the flow control devices, each flow control device in fluid communication with a respective inflow port of the plurality of inflow ports.

19. The method of claim 18, wherein the plurality of flow control devices are configured to reduce a variation in a temperature of the fluid entering each inflow port to at least partially equalize a distribution of fluid temperature in the producer well.

20. The method of claim 18, wherein the plurality of flow control devices are configured to control a temperature of the fluid entering each inflow port to produce a selected thermal gradient in the producer well.

* * * * *